Feb. 26, 1924. 1,484,672
C. M. POWER
CROSS CHAIN CONNECTER FOR ANTISKID DEVICES
Filed Dec. 3, 1921
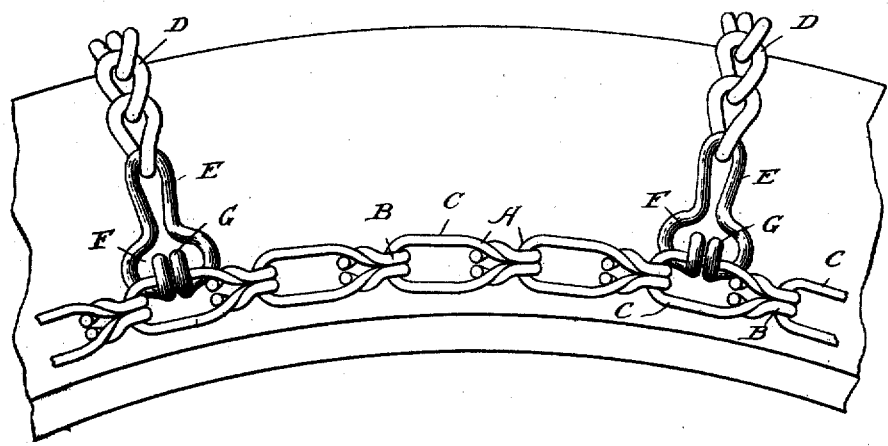
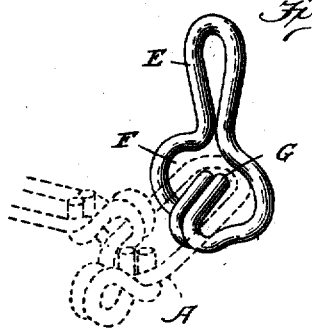
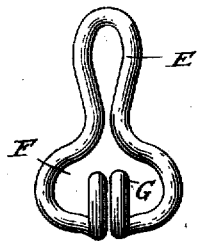
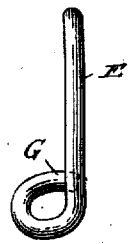
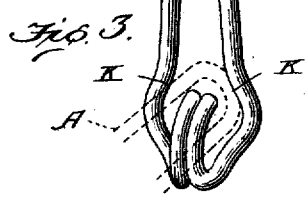
Inventor
Charles M. Power Patented Feb. 26, 1924.

1,484,672

UNITED STATES PATENT OFFICE.

CHARLES M. POWER, OF PITTSBURGH, PENNSYLVANIA, ASSIGNOR TO UNITED STATES CHAIN & FORGING CO., OF PITTSBURGH, PENNSYLVANIA, A CORPORATION OF PENNSYLVANIA.

CROSS-CHAIN CONNECTER FOR ANTISKID DEVICES.

Application filed December 3, 1921. Serial No. 519,645.

*To all whom it may concern:*

Be it known that I, CHARLES M. POWER, a citizen of the United States, residing at Pittsburgh, in the county of Allegheny and State of Pennsylvania, have invented certain new and useful Improvements in Cross-Chain Connecters for Antiskid Devices; and I do hereby declare the following to be a full, clear, and exact description of the same, reference being had to the accompanying drawings, forming part of this specification.

This invention relates to anti-skid devices for vehicle tires, the objects being to provide a convenient and cheap means for securing or coupling the cross chains to the side chains, whereby the cross chains may be readily renewed when worn or broken, without requiring the use of special tools or appliances for deforming the coupling members.

The invention consists primarily in a peculiar form of coupling link having a hook portion with entrance openings so arranged that while the link of the side chain may be caused to enter by a compound movement, nevertheless the accidental escape is prevented and hence, when assembled, the parts are to all intents and functional purposes permanently united. The invention further consists in certain novel details of construction and combinations and arrangements of parts, all as will be now described and pointed out in the accompanying claims.

In the drawings,—

Figure 1 is a view of a section of an antiskid device embodying the present invention;

Fig. 2 is a perspective view of one of the hook or coupling links with a link of a side chain in dotted lines in one position it assumes in making the connection mounted on a portion of a tire.

Fig. 3 is a view corresponding to Fig. 2, but showing a slightly different form of hook or coupling link;

Fig. 4 is a plan and

Fig. 5 an elevation of the link shown in Fig. 2.

The side chains A are of the usual well known wire link formation having at one end an eye B and an elongated body portion with substantially straight side bars C joining in a rounded end opposite the eye end. The cross chains may also be of the usual welded and twisted link formation shown at D, and each end of each cross chain is provided with a coupling for uniting it to the side chains.

The coupling links made in accordance with the present invention are preferably formed up of bar or wire stock, but obviously may be steel or malleable castings and embody a loop or opening in the body portion E for the reception of the end link of the cross chain. In addition to the cross chain link receiving opening, the coupling link is provided with an opening F for the endwise insertion of one of the links of the side chain and with a hook G formed preferably by the reversely bent and curved ends of the wire stock, the terminal of the hook being located within the opening F and spaced from the walls of the opening to permit the end of the side chain link to be passed through the opening and around the end of the hook. When the side chain link is once within the hook it may be given a half turn to bring the side bar in position within the hook after which the adjacent connecting link of the side chain assumes its normal position in the end of its companion link and the coupling link is prevented from accidental escape. Obviously, instead of bringing the side bars of the coupling link into proximity they may be spaced apart somewhat as in Fig. 3 and the entrance opening narrowed somewhat, thus making the entrance openings K to the hook somewhat more inclined to each other, with the result that the side chain link must be inserted first on one side, as in Fig. 3, and then given a twisting movement to bring its side bar into the hook.

When the coupling link is formed of wire or bar stock, the spreading of the side bars to form the entrance opening for the side chain link gives the device a very characteristic appearance and at the same time the ends being located centrally of such opening protects them and also prevents them from coming into contact with or injuring the tire or casing.

It will be noted, in both forms of the connecting link, that the opening for the side chain link is of substantially I-shape formation, the side bars of the coupling link converging toward the cross chain receiving opening. In the preferred form, the side bars of the coupling link almost contact with each other, as shown in Fig. 4, while in the modified form of link shown in Fig. 3, said bars are spaced somewhat apart. In both instances, however, the distance between these converging walls is less than the width of the side chain link, the converging walls practically forming an eye through which the side chain link is passed endwise. This prevents the side chain link, when turned to place its side bars parallel with those of the connecter link, from taking a pivotal bearing on the end portions of the coupling link and freeing itself from said coupling link. This invention, however, is not to be limited to the two particular shapes shown as the essence of the invention is to have the side bars converge towards each other to form an I-shaped side chain link receiving opening, the converging walls of which will prevent accidental displacement of the side chain link.

What is claimed is:

1. A one piece hook link adapted to have a cross chain link of an anti-skid device connected to one of its ends and adapted to be detachably connected to one of the side chain links of said device, said link having an opening therein for the insertion of the side chain link, and a side chain link retaining hook with its terminal extending freely into the side chain link receiving opening, a portion of each of the side bars of the hook link converging towards the end to which the cross chain is attached and the distance between the divergent ends of the side bars being at least equal to the outside width of the side chain link and the distance between the constricted portions of the converging side bars being less than the outside width of the side chain link whereby the side chain link is insertable in and removable from said opening only by an endwise movement.

2. A hook link for detachably connecting the cross chain of an anti-skid device to a side chain thereof, said hook link consisting of a piece of material bent to form an opening for receiving one of the side chain links and having a hook at one end of said opening with the terminal of the hook extending into said opening, the side bars of the hook link at a point in line with the hook terminal being spaced comparatively far apart and said side bars converging from said point towards the opposite end of said opening, the distance between the restricted portions of the side bars, being less than the outside width of the side chain link, whereby the side chain link can be inserted in and removed from the opening by an endwise movement only of the side chain link.

3. A hook member for joining an end link of one of the cross chains of an anti-skid device to a link of one of the side chains thereof, said member being formed with a single length of material bent to provide a bight for receiving a link of one of said chains, the end portions of the material being bent down with their extremities located in the plane of said bight and a portion thereof between the end portions and said bight being bent over upon said bight to form a second bight for receiving a link of the other chain, said bent down end portions being adapted to limit the movement of the last named link towards the closed end of the first named bight.

CHARLES M. POWER.

Certificate of Correction.

It is hereby certified that in Letters Patent No. 1,484,672, granted February 26, 1924, upon the application of Charles M. Power, of Pittsburgh, Pennsylvania, for an improvement in "Cross-Chain Connecters for Antiskid Devices," errors appear in the printed specification requiring correction as follows: Page 1, line 106, for the compound word "I-shape" read *eye-shape;* page 2, line 20, for the compound word "I-shaped" read *eye-shaped;* and that the said Letters Patent should be read with these corrections therein that the same may conform to the record of the case in the Patent Office.

Signed and sealed this 1st day of April, A. D. 1924.

[SEAL.]                                  KARL FENNING,
*Acting Commissioner of Patents.*